United States Patent
Vick

(10) Patent No.: US 6,648,161 B2
(45) Date of Patent: Nov. 18, 2003

(54) TANK CAP APPARATUS WITH ASSISTED OPENING INDENTATION

(75) Inventor: Christian Vick, Winsen (DE)

(73) Assignee: Dolmar GmbH, Hamburg (DE)

( * ) Notice: Subject to any disclaimer, the term of this patent is extended or adjusted under 35 U.S.C. 154(b) by 0 days.

(21) Appl. No.: 09/909,332

(22) Filed: Jul. 19, 2001

(65) Prior Publication Data

US 2002/0017523 A1 Feb. 14, 2002

(30) Foreign Application Priority Data

Aug. 1, 2000 (DE) .......................... 200 13 210

(51) Int. Cl.$^7$ .............................. B65D 41/04
(52) U.S. Cl. ................ 220/288; 215/302; 215/303; 215/305; 81/3.48
(58) Field of Search ................ 220/288, 284; 215/302, 303, 304, 305, 215, 296, 298; 81/3.55, 3.48, 3.4, 3.07

(56) References Cited

U.S. PATENT DOCUMENTS 2,246,649 A * 6/1941 West
2,408,233 A * 9/1946 Smith
3,653,530 A * 4/1972 Winfrey ...................... 215/302
4,252,249 A * 2/1981 Beckhardt et al. .......... 215/302
5,158,194 A * 10/1992 Sirgo et al. ................. 215/219

FOREIGN PATENT DOCUMENTS

| DE | 19610471 C2 | 2/1981 |
| DE | 29520025 U1 | 4/1996 |
| DE | 29920579 U1 | 6/2001 |
| GB | 245337 | 1/1926 |
| JP | 2000-344266 A | 12/2000 |

* cited by examiner

Primary Examiner—Robin A. Hylton
(74) Attorney, Agent, or Firm—McCormick, Paulding & Huber LLP

(57) ABSTRACT

A tank cap has an upper longish handle portion engageable by a user's hand to open and close the cap relative to the tank. The handle also has, on each of its two sides, an indentation into which a screwdriver or the like can be inserted to aid in rotating the cap in the opening direction, the indentation being shaped so that if the inserted screwdriver is moved in the direction corresponding to closing of the cap the screwdriver will be cammed out of the indentation without over-tightening the cap in the closing direction.

2 Claims, 2 Drawing Sheets

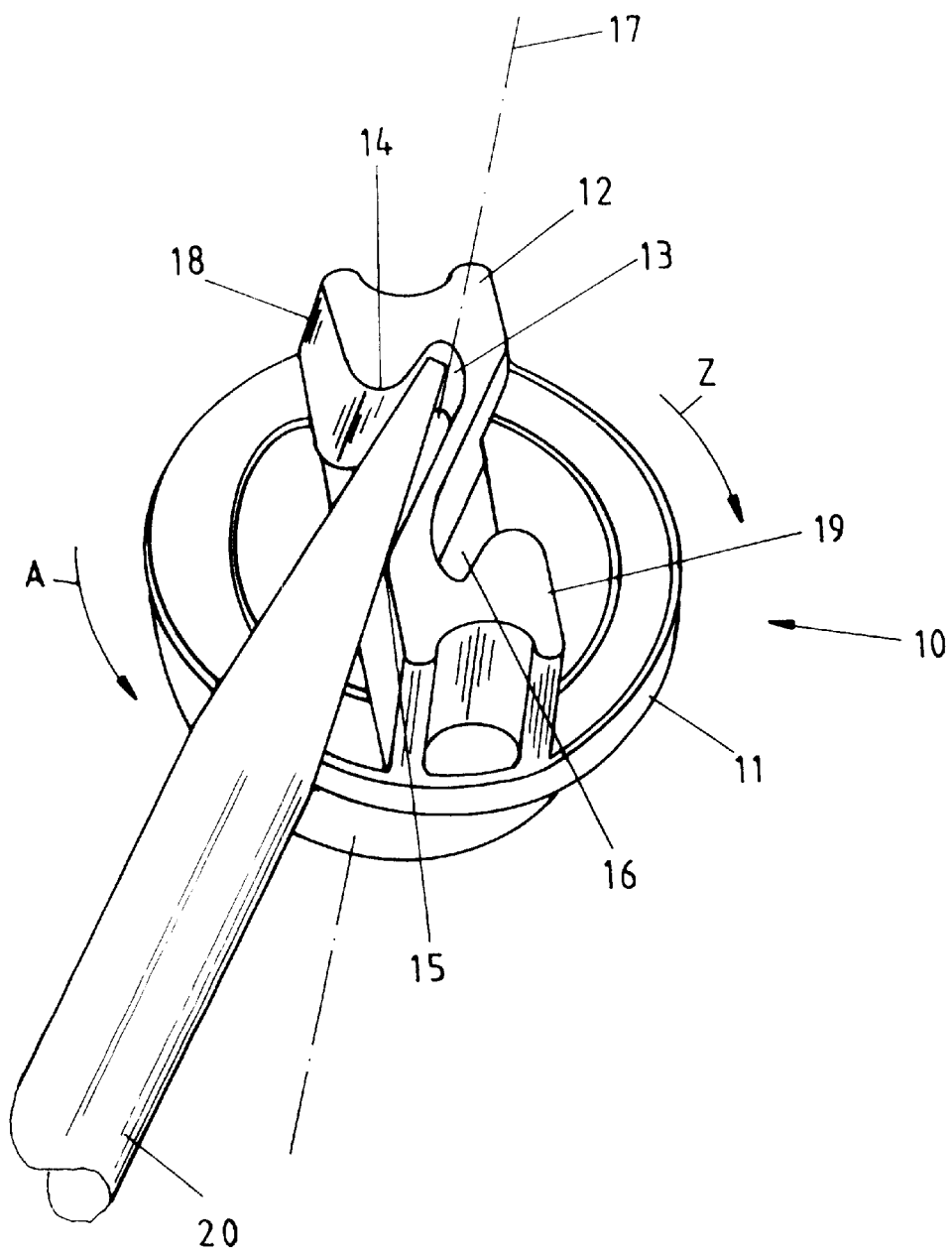

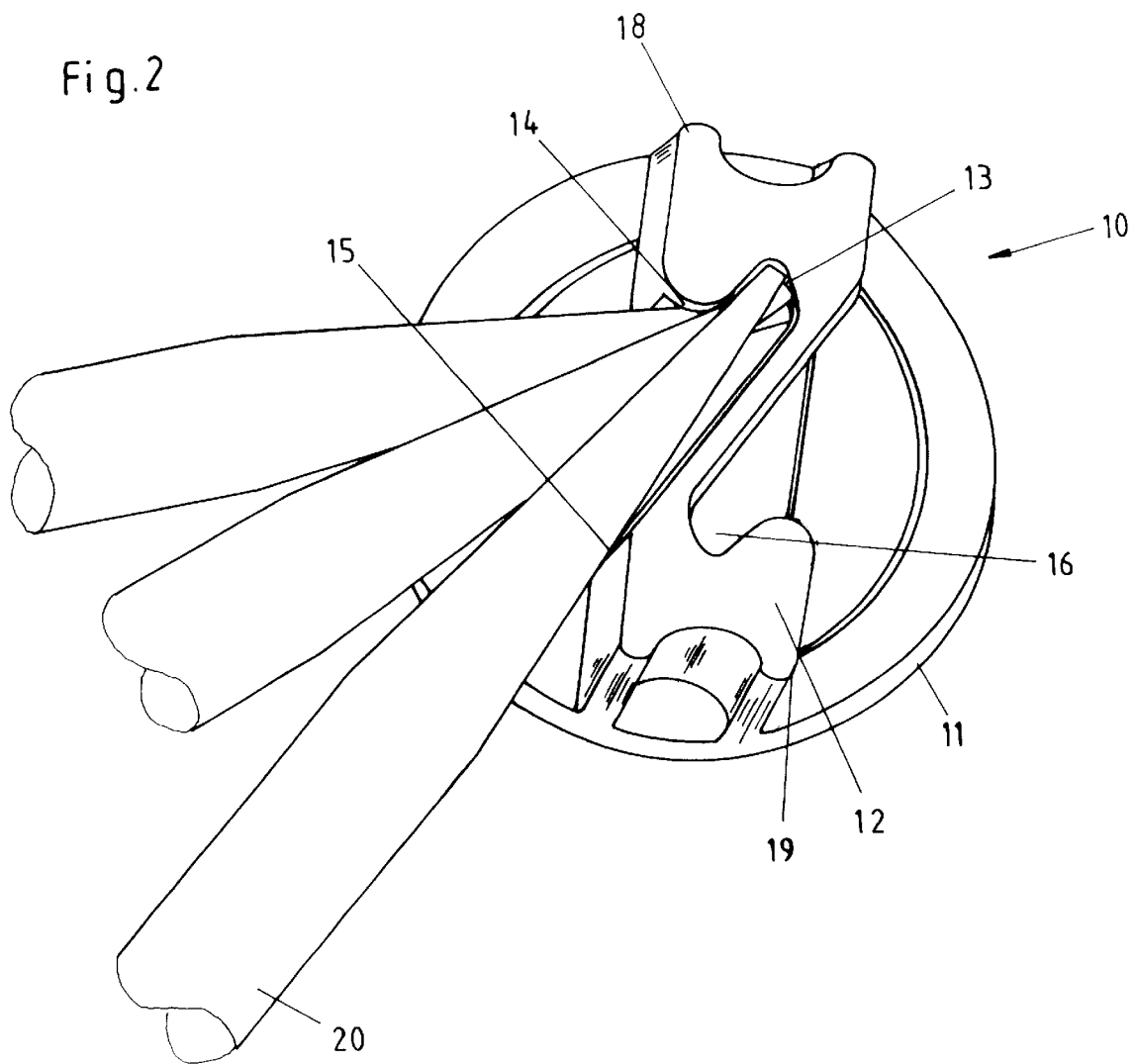

TANK CAP APPARATUS WITH ASSISTED OPENING INDENTATION

This invention relates to the field of the ignition engines. It concerns an overturn-safe tank cap according to the preamble of claim 1.

Such a tank cap has been already described, for example, by the applicant in a prior utility model application (No. 299 20 579.7).

The tank cap of the prior utility model application has a closing member on the upper side of which two gripping elements are placed which are opposing in a line, spaced from each other, by means of which an operator can twist the closing member into the closing position or can unscrew it out of the closing position. Since such a closing member can easily get stuck in the closing position and is then no longer to loosen or only very hardly, the intermediate space between both gripping elements is configured in such a way that a tool, especially the screw driver part of a combined wrench, such as that which belongs to the accessories of motor-driven hand tools, can be introduced into the intermediate space and can so be used as a lever for applying an additional torque. So as to avoid that this additional torque can also be applied when closing the tank opening and can then cause the overturn of the tank cap, the flanks of the gripping elements which are adjacent to the intermediate space are configured asymmetrically by one-sided bevelled surfaces in such a way that the tool when used as a lever in the closing direction side-slips, while in the opening direction it remains engaged with the closing member.

For comparatively big closing elements, such a solution is appropriate as an overturn safety device because, despite the intermediate space between the gripping elements, the tank cap can be easily operated simply with the hand under normal circumstances and the interruption of the lateral gripping surfaces by the intermediate space and the bevelled surfaces is not very important.

On the other hand, the situation is different when the closing member is considerably smaller. In this case, such a reduction of the gripping surfaces results in that the operator cannot operate the closing member simply with the hand any longer, even under normal circumstances.

Thus, the aim of the invention is to create an overturn-safe tank cap of the type mentioned above which makes possible a safe manipulation simply with the hand, even with reduced size, without having to renounce to the overturn-safe use of a tool (for example, of a combined wrench).

This aim is achieved by the whole characteristics of claim 1. The heart of the invention consists in that the engaging means are configured as an indentation for inserting the tool which penetrates into the closing member from outside transversely to the rotation axis and the shape of the indentation is configured in such a way that the tool, when untwisting, grasps behind a jut and is supported on a supporting surface opposite the jut, while the tool when turning off is unscrewed from the indentation. Due to the configuration of the engaging means as an indentation, the handle on the closing member can practically be configured uninfluenced in such a way that it can be safely operated simply with the hand even when the closing member is small.

Basically, it is conceivable to place the indentation in the basic body of the closing member itself. However, a preferred configuration of the tank cap according to the invention is characterized in that the closing element has on the upper side a longish handle extending transversely over the upper side which is limited on both longitudinal sides respectively by a gripping surface and that the at least one indentation penetrates laterally into the handle from the one of the gripping faces. So, a safe setting possibility for the tool is guaranteed even in case of narrow space conditions.

The access with the tool is still easier if, according to an advantageous further development the at least one indentation is open upwards.

If, according to another preferred embodiment of the tank cap according to the invention, several indentations are placed on the closing member around the rotation axis symmetrically to the axis, the tool can be set more easily in different positions of the closing member because there are different selection possibilities.

The invention will be explained in more detail below with an embodiment with reference to the attached drawings.

FIG. 1 is a perspective representation of a preferred embodiment of the tank cap according to the invention with a tool in form of a screw driver which is engaged.

FIG. 2 shows the effect of the unscrewing of the screw driver out of the tank cap according to FIG. 1 when applying a torque in the closing direction.

FIG. 1 is a perspective representation of a preferred embodiment of the tank cap according to the invention with a tool in form of a screw driver which is engaged. The tank cap 10 comprises a cylindrical closing element 11 which is equipped on the lower side for example with a screw thread and which shows on the upper side a longish handle 12 projecting upwards, extending transversely over the closing element 11. When closing, the closing element 11 is turned around a central rotation axis 17 in the drawn position Z (CLOSED); the untwisting (loosening) is effected in the opposite direction A (OPEN).

The handle 12 is limited on the longitudinal sides by vertical gripping surfaces 18, 19 which the operator grips when the tank cap 10 should be actuated simply with the hand. Starting from the gripping surfaces 18, 19, two narrow indentations 13, 16, open upwards, the axis of which is symmetrical to the rotation axis, extend into the handle 12. The indentations 13, 16 form an oblique angle to the longitudinal axis of the handle 12 and are limited on the inner side also by vertical walls. Due to the oblique orientation of the indentations 13, 16, there results on the one side a cam-type jut 14, however on the opposite side a comparatively poorly inclined supporting surface 15.

If—as shown in FIGS. 1 and 2—a screw driver 20, which can be a part of a combined wrench, is now introduced laterally into one of the indentations 13, 16 (in the example into the indentation 13) and if it is engaged with the closing member, an additional torque can be exerted with the screw driver 20, depending on the direction of rotation. For loosening the tank cap 10 (rotation in direction A), the screw driver 20 grasps with its point behind the jut 14 and is simultaneously supported on the opposing side on the supporting surface 15. In the same way, an additional torque can be applied when loosening, this torque allowing an opening of the cap even when the closing member 11 gets stuck.

On the other hand, a driving in (overturn) of the tank cap by using the tool or the screw driver 20 is not possible. As can be recognized in FIG. 2, which shows several positions of the screw driver 20 in the indentation 13, the screw driver, when turning in the opposite direction Z, moves on rolling contact on the jut 14 and is getting unscrewed from the indentation 13, while its point slides along the opposite inner face of the indentation 13 without support. So, a driving in of the tank cap 10 is only possible simply with the hand, whereas a loosening is also possible with a tool (20).

Compared with the previous solution described above, it is here advantageous that gripping surfaces 18, 19 are available which are not limited by oblique faces and thus allow for a safe and pleasant actuation simply with the hand, even when the closing members are smaller.

LIST OF REFERENCE NUMERALS

10 Tank cap
11 Closing member
12 Handle
13,16 Indentation
14 Jut
15 Supporting surface
16 Rotation axis
18,19 Gripping surface
20 Screw driver

What is claimed is:

1. A cap for selectively closing an opening in a tank by rotating about a rotation axis in a first direction, said cap selectively releasing from said opening in said tank by rotating about said rotation axis in a second direction, said cap comprising:

an indentation formed in said cap, said indentation extending into said cap transverse to said rotation axis;

a jut formed in said cap, said jut being oriented adjacent said indentation;

wherein said indentation is adapted to accept a tool therein, said tool being arrested by said jut and imparting additional torque to said cap when said tool is inserted into said indentation and rotated in said second direction;

wherein said tool disengages from said jut and said indentation when said tool is inserted into said indentation and rotated in said first direction;

a handle protruding outwardly from said cap, said handle being defined on both longitudinal sides respectively by a gripping surface and said indentation penetrating laterally into the handle; and wherein a profile of said indentation is defined in an exterior surface of said handle, thereby permitting insertion of said tool into said indentation in a direction transverse to said first and second directions.

2. A tank cap according to claim 1, further including a plurality of said indentations formed in said cap around the rotation axis symmetrically to the rotation axis.

\* \* \* \* \*